Nov. 11, 1958     E. L. PABST ET AL     2,859,965
STACKERS AND WORK DELIVERY APPARATUS
Filed Aug. 1, 1956     10 Sheets-Sheet 1
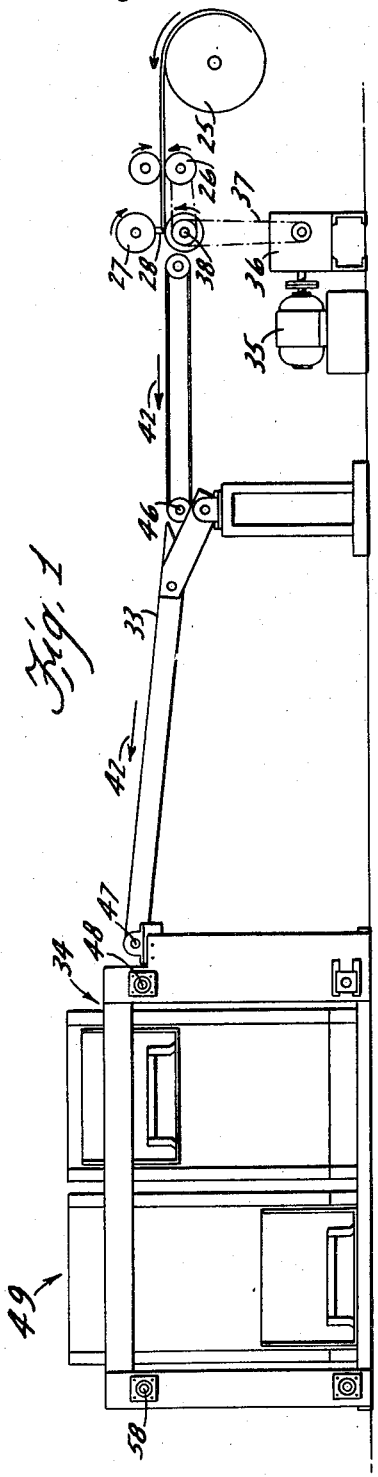
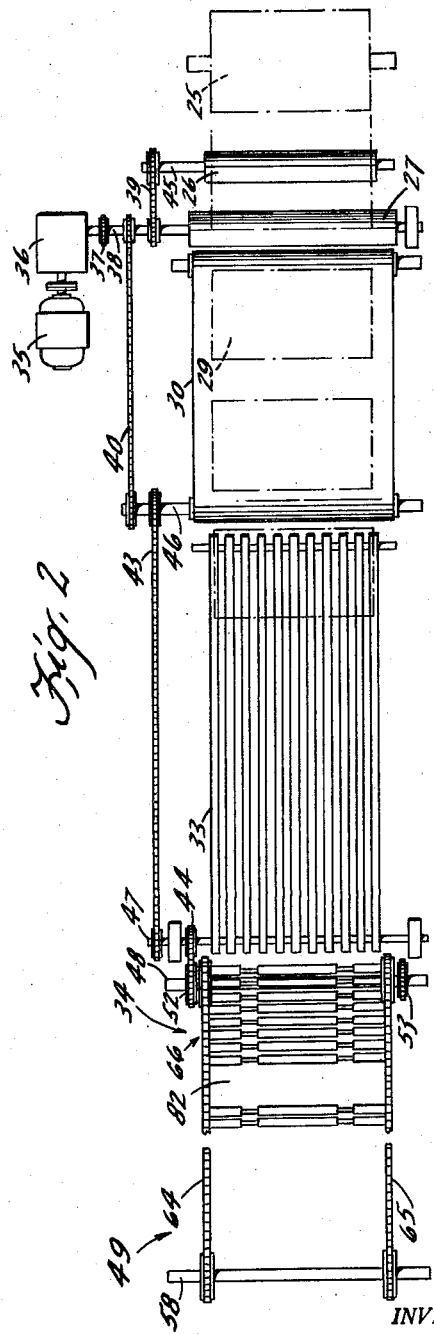
INVENTORS
EDWIN L. PABST
HARRY VANDERHOUT
BY Wheeler, Wheeler + Wheeler
ATTORNEYS

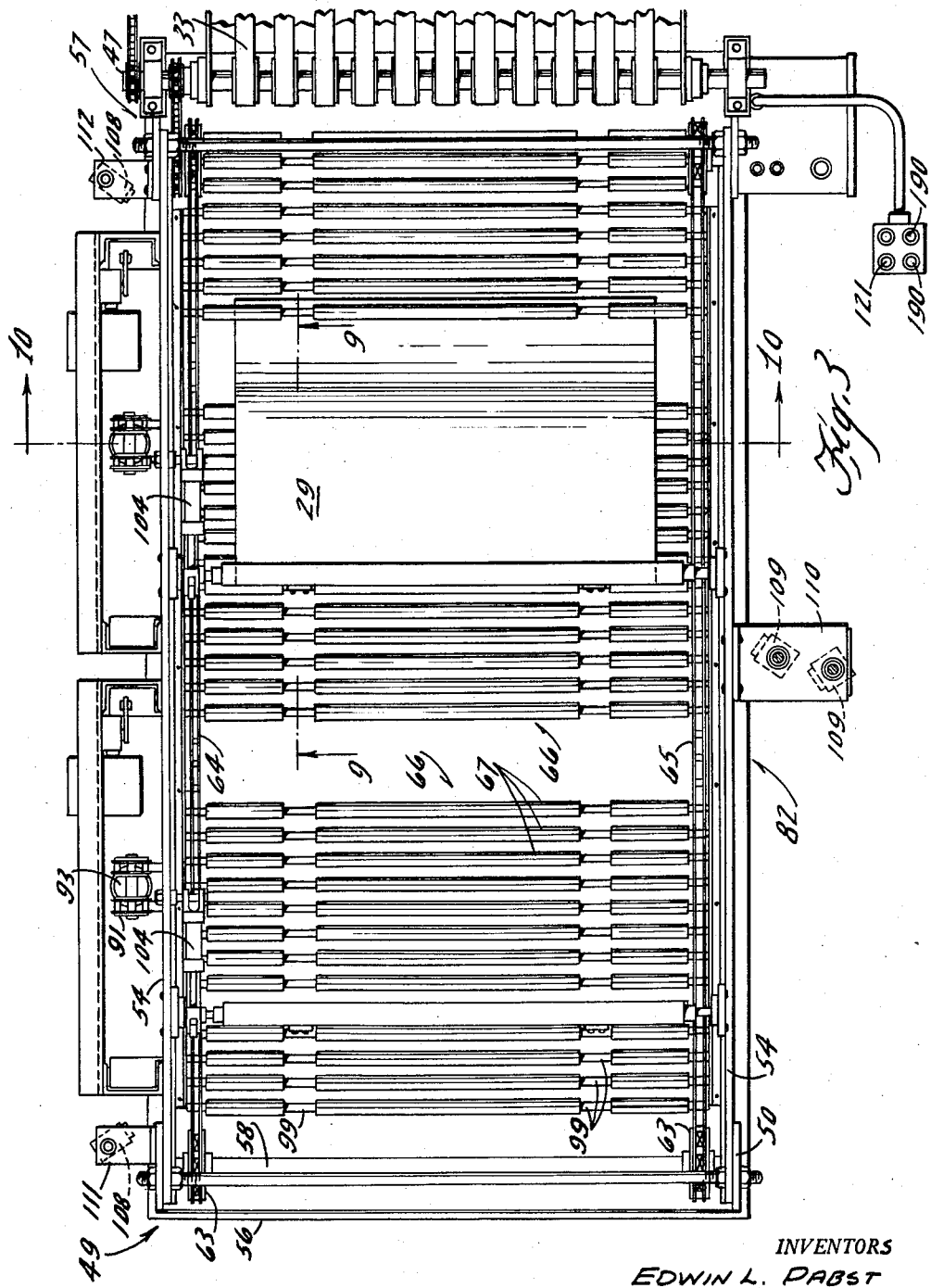

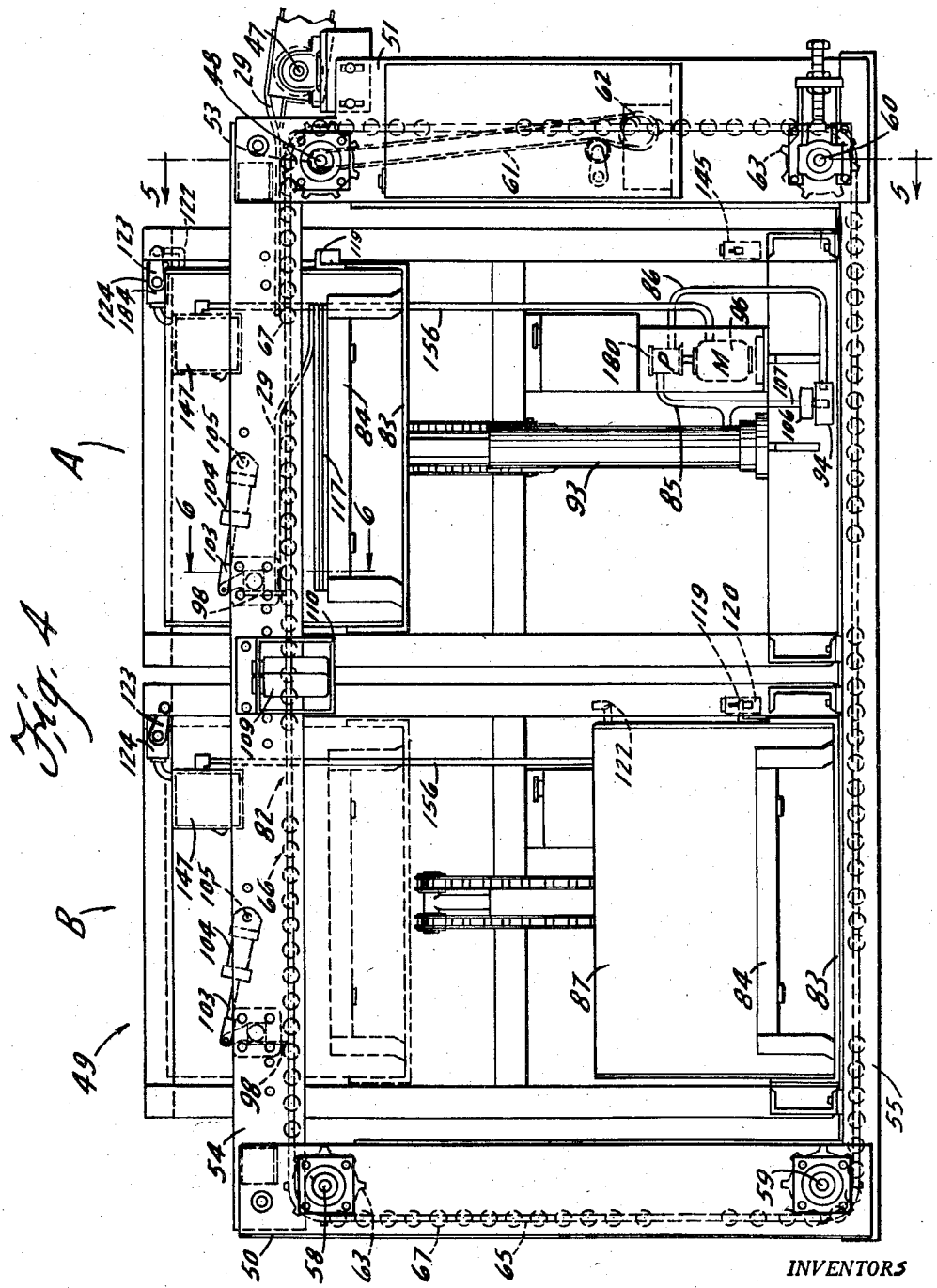

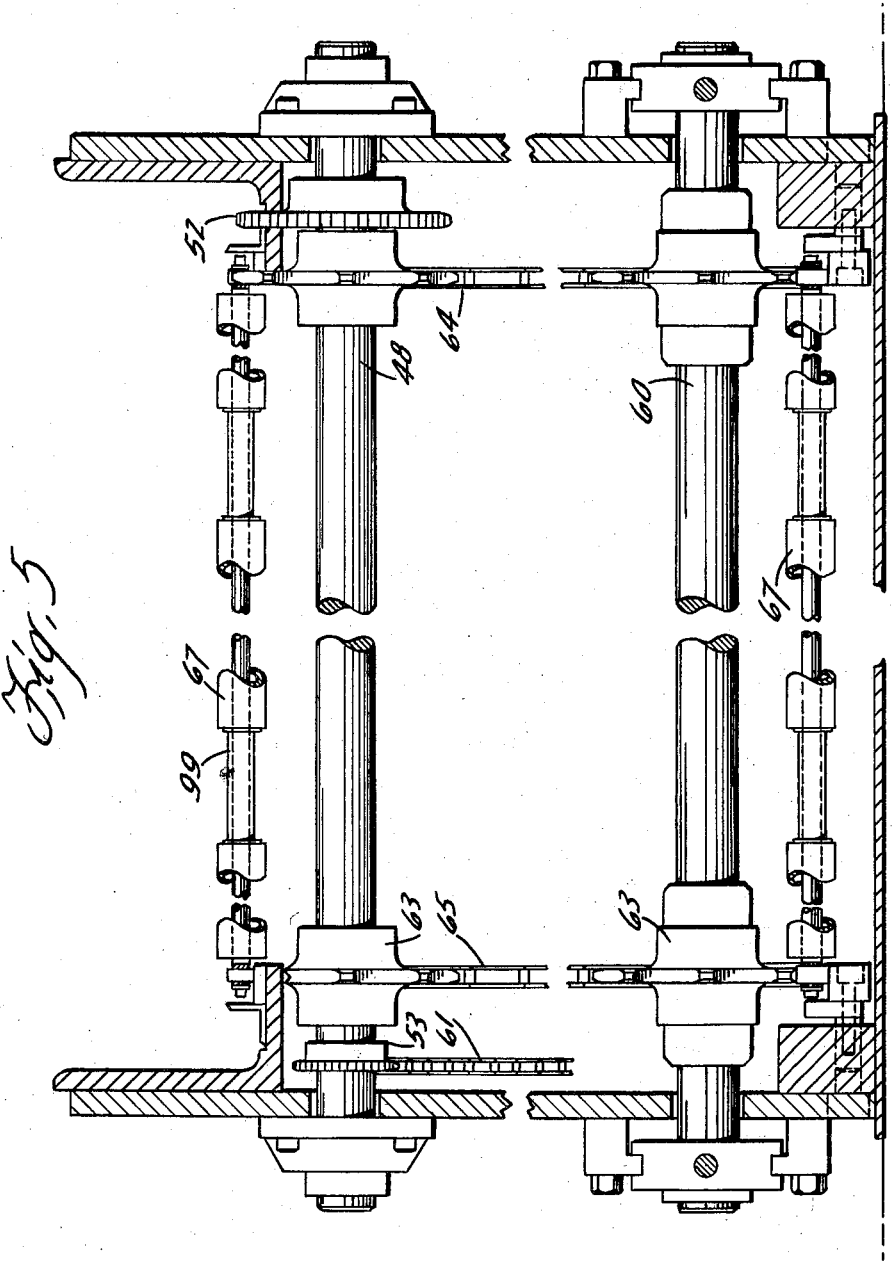

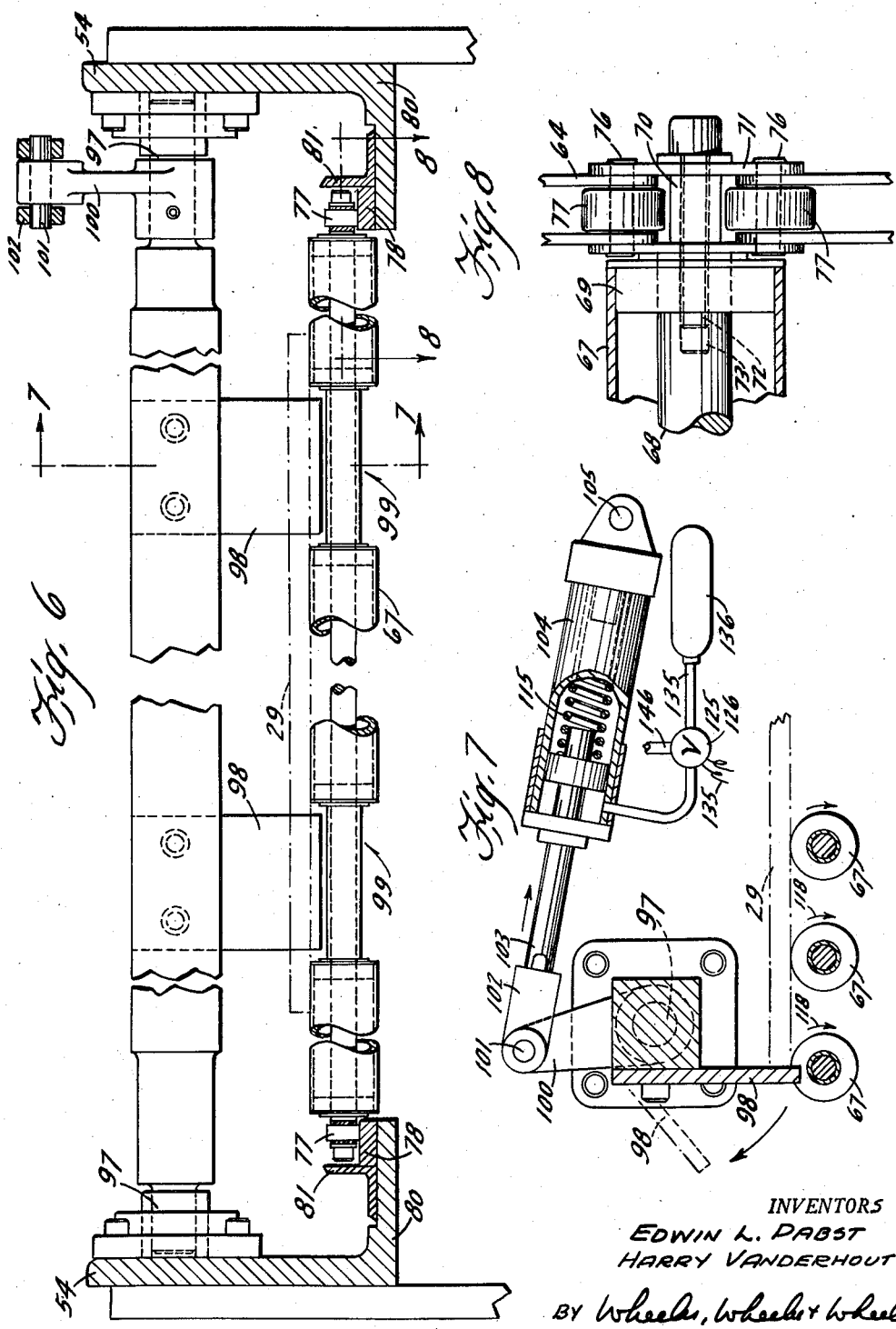

Nov. 11, 1958 E. L. PABST ET AL 2,859,965
STACKERS AND WORK DELIVERY APPARATUS
Filed Aug. 1, 1956 10 Sheets-Sheet 6
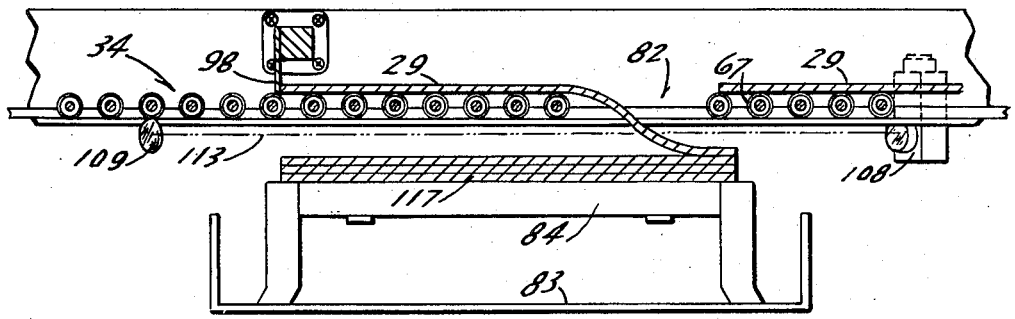
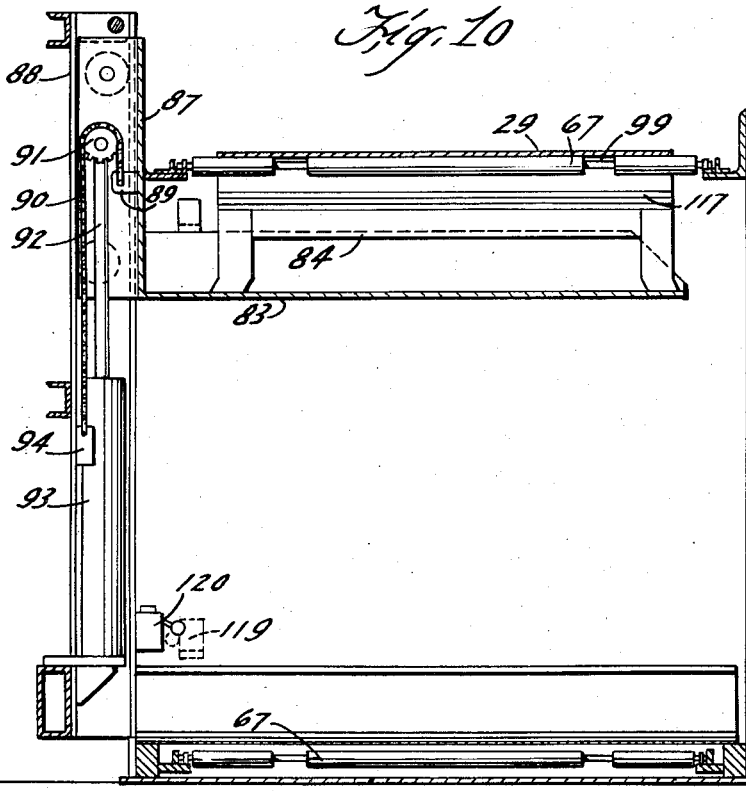
INVENTORS
EDWIN L. PABST
HARRY VANDERHOUT
BY Wheeler, Wheeler & Wheeler
ATTORNEYS

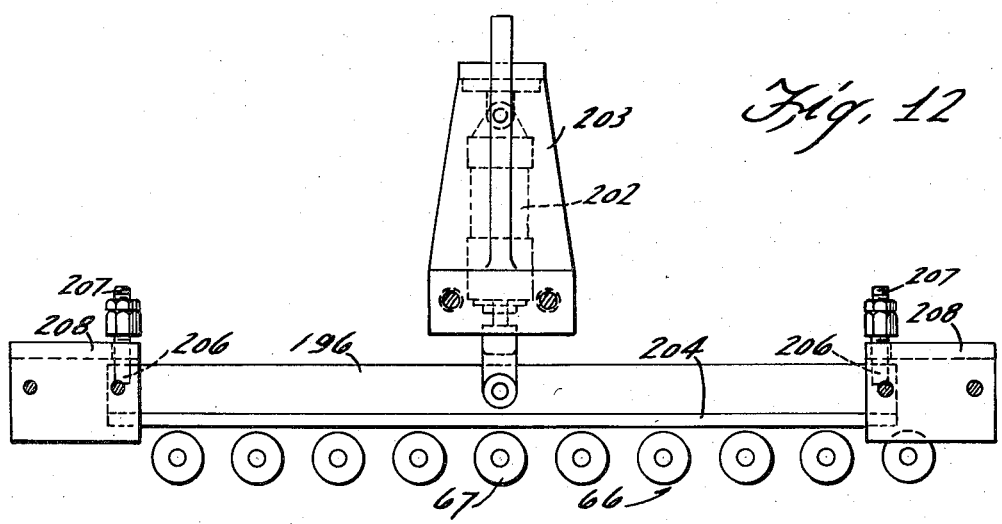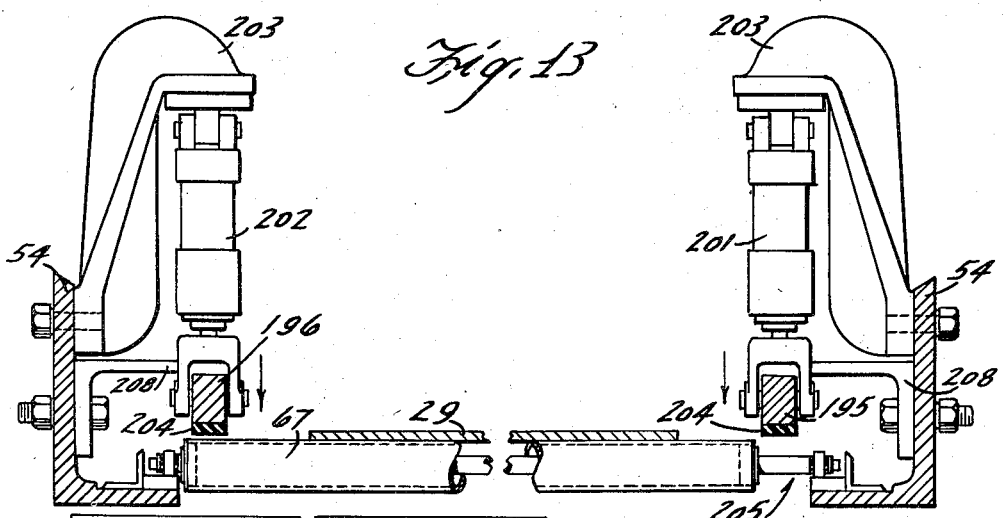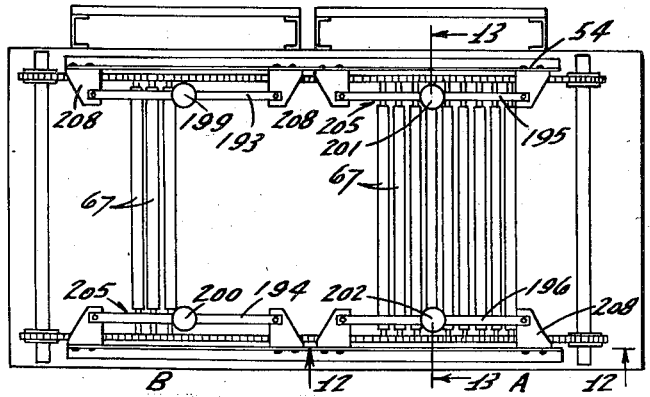

INVENTORS
EDWIN L. PABST
HARRY VANDERHOUT

BY Wheeler, Wheeler + Wheeler
ATTORNEYS

Nov. 11, 1958  E. L. PABST ET AL  2,859,965
STACKERS AND WORK DELIVERY APPARATUS
Filed Aug. 1, 1956  10 Sheets-Sheet 9
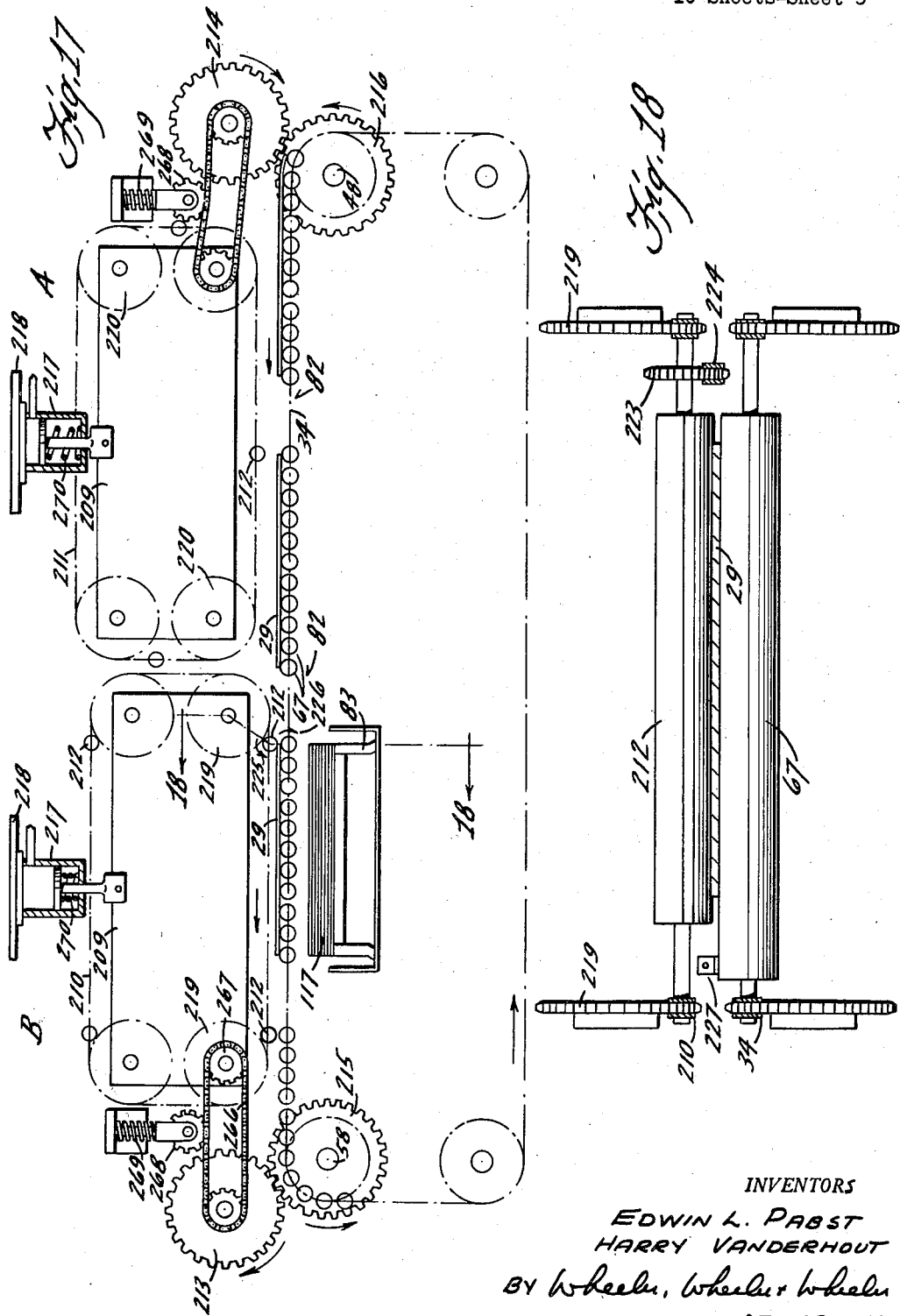
INVENTORS
EDWIN L. PABST
HARRY VANDERHOUT
BY Wheeler, Wheeler + Wheeler
ATTORNEYS Nov. 11, 1958   E. L. PABST ET AL   2,859,965
STACKERS AND WORK DELIVERY APPARATUS
Filed Aug. 1, 1956   10 Sheets-Sheet 10
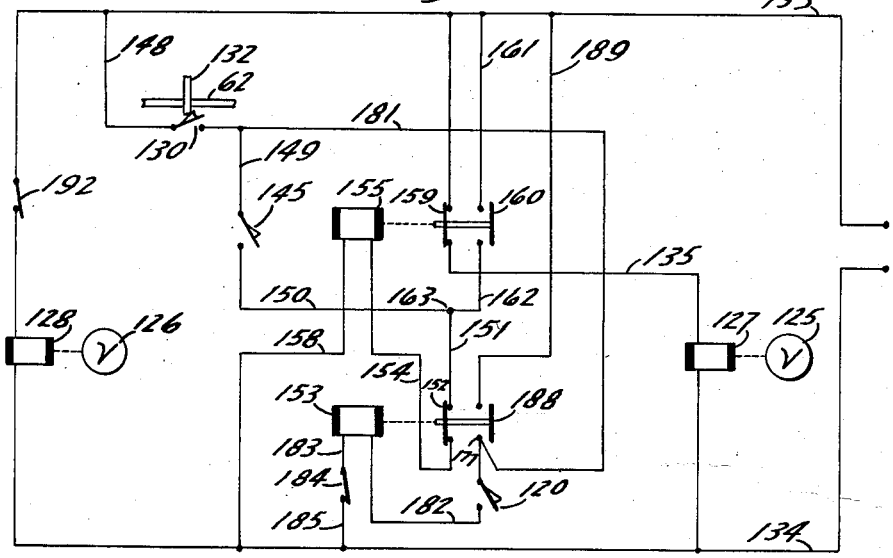
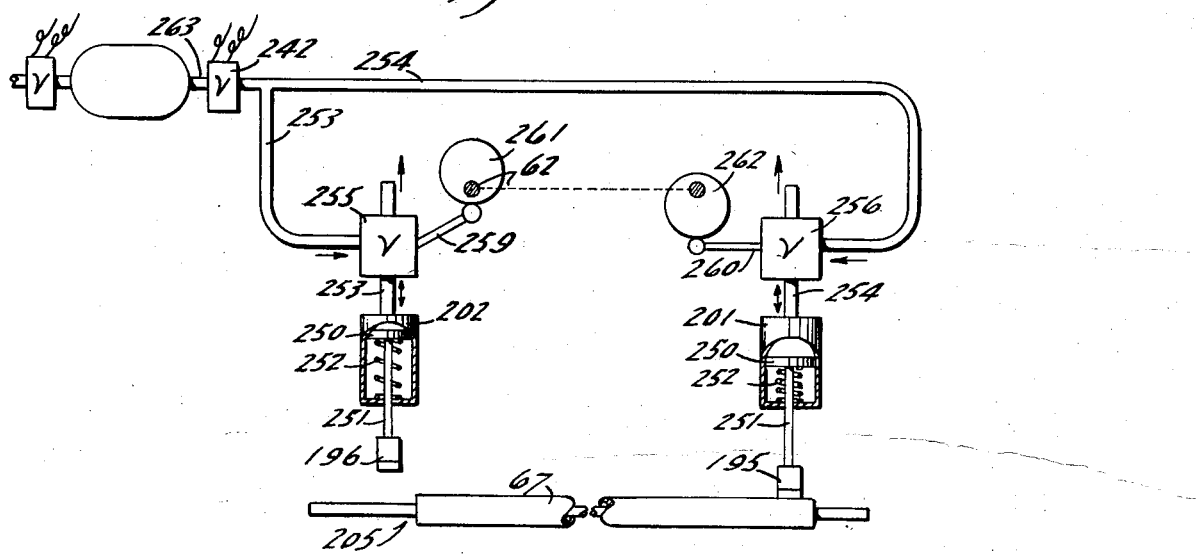
INVENTORS
EDWIN L. PABST
HARRY VANDERHOUT
BY Wheeler, Wheeler & Wheeler
ATTORNEYS

United States Patent Office 2,859,965
Patented Nov. 11, 1958

2,859,965

STACKERS AND WORK DELIVERY APPARATUS

Edwin L. Pabst and Harry Vanderhout, Milwaukee, Wis., assignors to Alfa Machine Company, Inc., Milwaukee, Wis., a corporation of Wisconsin Application August 1, 1956, Serial No. 601,544

12 Claims. (Cl. 271—68)

This invention relates to improvements in stackers and work delivery apparatus adapted to convey workpieces to the stacker and to discharge said pieces thereto.

The device of our invention is adapted to stack any workpiece and particularly workpieces in sheet form. Such workpieces may range in thickness and stiffness from rubber flooring tile, for example, to pieces as light and flimsy as glass wool batts and even sections of cloth or rugs.

The delivery carrier or conveyor of the present invention is characterized by sets of multiple roller supports for the workpieces, the sets being spaced longitudinally of the conveyor to provide work discharging gaps therebetween through which the workpieces are discharged by gravity into stacks when the travel of the workpieces is arrested with respect to continued movement of the conveyor. In different embodiments of the invention we may provide different apparatus for arresting movement of the workpieces. These may comprise, for example, retractable stops, clamps or brakes for engaging the periphery of the conveyor rollers, and an upper conveyor having a powered pinch roller which cooperates with a roller of the workpiece conveyor to discharge the work sheet rearwardly therebetween.

While not essential, we prefer to provide multiple stacking stations in the device of our invention, particularly for high speed operation. Each of the stations is equipped with an elevator upon which a loading platform or pallet is removably disposed. We provide means for automatically discharging work sheets onto the elevator at one station until that station is full, whereupon the conveyor then automatically discharges work sheets at another station. Meanwhile the loaded stack at the full station can be removed and the elevator restored to a position to accept work sheets when the elevator at the other station has been filled. Ordinarily two stations are adequate to handle workpiece sheets of conventional thickness even in a high speed operation. However, additional stations as required may be provided, the principle of operation being the same.

Other objects and advantages of the invention will be more apparent to one skilled in the art upon an examination of the following disclosure in which:

Fig. 1 is a diagrammatic side elevation showing apparatus embodying my invention.

Fig. 2 is a plan view of the device of Fig. 1.

Fig. 3 is an enlarged plan view of stacking devices according to our invention, the approach conveyor being shown fragmentarily.

Fig. 4 is an enlarged side elevation of the portion of the device shown in Fig. 3.

Fig. 5 is a fragmentary cross sectional view taken along the line 5—5 of Fig. 4.

Fig. 6 is an enlarged fragmentary view taken along the line 6—6 of Fig. 4.

Fig. 7 is a fragmentary cross sectional view taken along the line 7—7 of Fig. 6.

Fig. 8 is an enlarged cross sectional view taken along the line 8—8 of Fig. 6.

Fig. 9 is a fragmentary cross sectional view taken along the line 9—9 of Fig. 3.

Fig. 10 is a cross sectional view taken along the line 10—10 of Fig. 3.

Fig. 11 is a plan view of a modified embodiment of the invention in which brake bars replace the retractable stops.

Fig. 12 is a cross sectional view taken along the line 12—12 of Fig. 11.

Fig. 13 is a fragmentary cross sectional view taken along the line 13—13 of Fig. 11.

Fig. 17 is a fragmentary view of a still further modification of the invention in which an upper conveyor having a pinch roller replaces the retractable stops.

Fig. 18 is an enlarged fragmentary cross sectional view taken along the line 18—18 of Fig. 17.

Fig. 20 is a circuit diagram of electric control apparatus for directing the discharge of workpieces to one or another of multiple stacking elevators.

Fig. 21 is a diagrammatic view showing the pneumatic control circuit for the air cylinders of Figs. 11–13.

Figure 14:
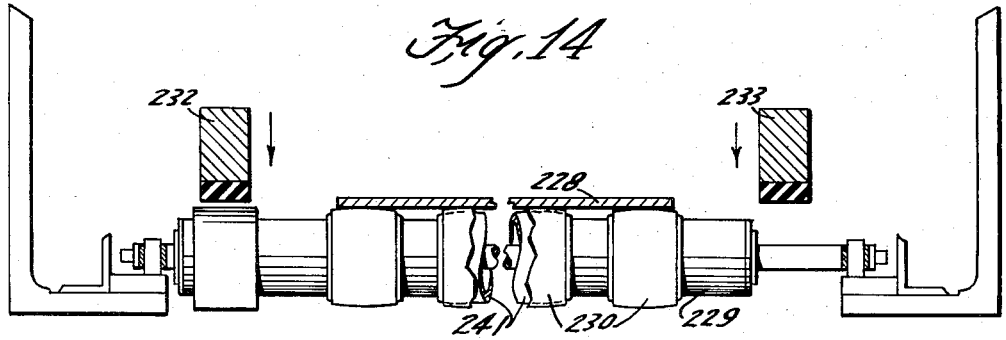
Fig. 14 is a fragmentary cross sectional view taken through a still further modified embodiment of the invention in which the rollers of respective sets are interconnected by belts ensleeved thereabout.

As best shown in Figs. 1 and 2, sheet material may be unwound from the parent roll 25 and fed by means of upper and lower feed rolls 26 to a rotary cutter 27 having a knife 28. Work sheets 29 cut off by knife 28 are delivered onto a belt conveyor 30 which is driven at a slightly faster rate of speed than the rotary cutter 27 to space the workpieces 29 thereon. The workpieces 29 are transferred from belt 30 to conveyor 33 and thence to the delivery carrier or conveyor indicated generally by reference character 34 in Figs. 1 and 2.

All conveyors are desirably powered by a single electric motor 35 connected through gearbox 36, chain drive 37, shaft 38 and respective chain drives 39, 40, 43 and 44 to the respective shafts 45, 46, 47 and 48 of the conveyor elements aforesaid and to the rotary cutter 27. Accordingly, the rotation of cutter 27 and the movement of all conveyors in the direction of arrows 42 is timed by the interconnections aforesaid so that the discrete severed workpieces 29 arrive at conveyor 34 in predetermined timed and spaced relation to the sets 66 of rollers thereon.

Work sheet delivery carrier or conveyor 34 is mounted on frame elements of the multiple station stacking machine 49 shown in detail in Figs. 3 and 4. For purposes of exemplification the machine is illustrated as having two stations A and B.

Stacking machine 49 comprises front and rear side support members 50, 51 and front and rear top and bottom cross members 54, 55. Front and rear side members 50, 51 are cross connected by top and bottom end members 56, 57.

In addition to conveyor sprocket shaft 48 at the upper righthand corner of the stacker frame as shown in Fig. 4, the frame is provided in its other three corners respectively with conveyor sprocket shafts 58, 59 and 60. All sprocket shafts aforesaid carry sprockets indicated collectively by reference character 63 about which two sets of parallel conveyor chains 64, 65 spaced to the rear and front of the machine are trained. The respective conveyor chains 64, 65 carry spaced sets 66 of multiple work supports 67 which in the preferred embodiment of the invention comprise rollers.

Shaft 48 has in addition a sprocket 52 to receive power from chain 44 and a sprocket 53 for chain 61 which operates the shaft 62 of the timer hereinafter described.

As best shown in Fig. 8 the individual rollers 67 have roller shafts 68 upon which the rollers are journaled for rotation on end bearings 69. At each end the shafts 68 have axial threaded openings 73 to receive the bolts 72 by which the conveyor chains 64, 65 are connected thereto. Each bolt 72 carries spacer sleeve 70 disposed between paired chain links 71. Chain link pins 76 near the respective ends of links 71 also carry wheels 77 which support the carrier at tracks 78 at the front and rear of the stacker frame. Members 54 of the frame are provided with horizontal flanges 80 for the support of the tracks 78 and also have guide rails 81 to prevent endwise movement of the respective rollers 77.

As hereinbefore noted, the respective sets 66 of multiple rollers 67 are longitudinally spaced, thus providing work discharging gaps 82 therebetween. The longitudinal extent of the roller sets 66 and work discharging gaps 82 is uniform for timing purposes.

The respective conveyor chains 64, 65 are driven from sprocket 52 on shaft 48. Accordingly the conveyor rollers 67 travel at the same lineal speed as work sheets 29 delivered thereto from conveyor 33.

Within the frame elements of the stacking machine 48 we provide multiple hydraulically or otherwise operated elevators having support platforms 83 upon which work receiving pallets 84 may be positioned manually or by conventional fork-lift trucks which may be driven up to the open side of the machine. The details of the elevator mechanism is best shown in Figs. 4 and 10. The platforms 83 are provided with back support plates 87 which move vertically in the vertical frame ways 88. The back plates 87 are connected by means of ears 89 (see Fig. 10) to chain 90. The chain is trained over an idler sprocket 91 pivotally mounted on the top of piston rod 92 of hydraulic cylinder 93. The other end of the chain 90 is fixed by bracket 94 to a stationary part of the machine, for exemplification the cylinder 93. Pressurization of cylinder 93 will lift piston 92 and correspondingly lift platform 83 with its pallet 84. If the hydraulic fluid is vented from the cylinder 93 the platform 83 and its load will descend by gravity.

The respective cylinders 93 for the respective elevators are supplied with fluid under pressure of respective pumps 180 actuated by respective motors 96. Appropriate electrical connections shown in the circuit diagram of Fig. 19 sequentially energize motors 96 and vent fluid from the cylinders 93 in accordance with the loading of the platform and subject to the operation of manual control buttons to be described hereinafter in detail. Pumps 180 have pressure lines 85 to the cylinder and intake lines 86 from sumps 94. Pressure line 85 is provided with a vent line 107 which vents to sump 94 under control of solenoid actuated valve 106.

As aforestated workpieces 29 arrive in timed relation to the movement of the delivery conveyor 34 so that the rearward margins of successive workpieces 29 register with particular rollers 67 of successive roller sets 66, for example the last roller as suggested in Fig. 17. Inasmuch as the conveyor 34 operates at the same lineal rate of speed as the transfer conveyor 33, rollers 67 will not turn as the workpieces 29 are shifted thereto.

For the purpose of depositing the workpieces on the respective elevator pallets 84, we provide in various embodiments of the invention various means for arresting movement of the workpieces on the rollers and causing rollers 67 to rotate reversely. In the embodiments of the invention shown in Figs. 3, 4, 6 and 7, front and rear top plates 54 of the frame support on cross shaft 97 stop blades 98 which retractably project into the path of workpieces 29. Note particularly in Fig. 6 that the several rollers 67 of the respective sets are provided with portions 99 of reduced cross section which align in the longitudinal direction of the machine with the respective stop blades 98. Accordingly, the stop blades may project radially downwardly beyond the outer periphery of the rollers 67 to clearly intercept the forward progress of the worksheets 29. The stop blade projection aforesaid is particularly advantageous where the forward margin of a flimsy work sheet is between rollers and tends to droop therebetween.

The respective shafts 97 on which the stop blades 98 at each station A and B are mounted are respectively provided with crank arms 100 connected at their respective ends by pins 101 to clevis 102 mounted at the ends of the piston rods 103 of pneumatic cylinders 104 in turn pivotally connected at 105 to frame side member 54. Accordingly, the stop blades 98 may be retracted from full line position shown in Fig. 7 to dotted line position shown in Fig. 7 by actuation of the pneumatic cylinder 104 to swing the stops 98 from the path of the advancing workpieces 29. The stops are respectively retracted and advanced for the purpose of depositing the work sheets on elevators at one station or the other in accordance with a sequence hereafter to be described more in detail.

As best shown in Fig. 9 we dispose between the level of the path of conveyor 34 and the raised elevator pallets 84 sets of photocells 108 and light sources 109 for light beam 113. The respective photocells and light sources are mounted diagonally across each elevator station on outboard brackets 110, 111 and 112 best shown in Fig. 3. Photocell 108 is also shown in the circuit diagram of Fig. 19 which illustrates the circuit by which each photocell triggers solenoid 116 which opens valve 106 in the hydraulic vent line 107 of cylinder 93 for gradually lowering elevator 83 as a stack 117 of sheet material builds up thereon.

For example, assuming that elevator 83 at the station A is in uppermost position, stop blades 98 at this station being down as illustrated, work sheets 29 carried by the conveyor rollers 67 will be advanced therealong until the leading edge of the respective work sheets engages the stop blades 98. Thereupon the rollers beneath the work sheet 29 will rotate clockwise as shown by the arrows 118 in Fig. 7 as the conveyor 34 continues to move forwardly beneath the work sheets. As soon as the trailing rollers 67 move out from the trailing margin of the work sheet 29, the rear margin will drop through the work discharging gap 82 following the set of rollers 66 to deposit the sheet progressively upon the stack 117 therebeneath. Work sheet 29 will flex progressively from its rear to its front margin in the course of its gravity transfer from the conveyor 34 to the stack 117. Meanwhile the next succeeding set of rollers 66 carrying the succeeding work sheet 29 will continue to move forwardly over the stack. Accordingly, as one work sheet 29 is deposited the next following work sheets will pass thereover to be successively deposited by gravity through the respective work discharging gaps 82 on the stack 117.

As soon as the level of stack 117 builds up sufficiently to break the beam of light 113, photocell 108 will trigger the circuit to actuate solenoid 116 as aforesaid. Solenoid actuated valve 106 is normally set to close the vent pipe 107. When triggered by photocell 108 to open position, the valve will release sufficient fluid to lower the elevator 83 to a level where light beam 113 is no longer broken. Valve 106 is biased by spring pressure or the like to closed position to hold the elevator in readiness for a subsequent lowering movement as the stack continues to build up to a level where it will again break the light beam 113.

When in the course of the successive lowering stages aforesaid the elevator is at or near its lowermost position, actuating lug 119 projecting laterally therefrom will engage the actuator arm of normally open lowermost limit switch 145 at station A and permit the workpieces to proceed to a position above the elevator at station B for deposit thereon. The loaded pallet at station A may then be removed by means of a fork-lift truck or the like and an empty pallet placed thereon.

Figure 19:
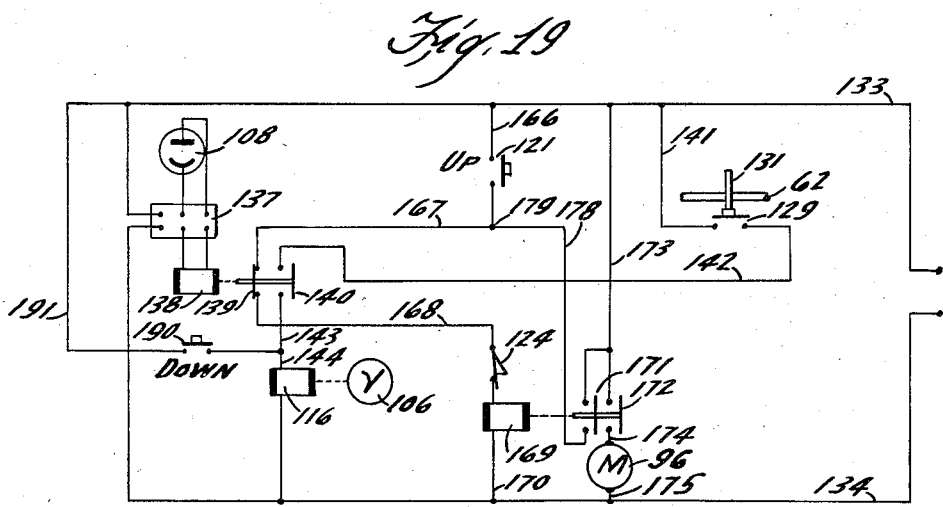
Fig. 19 is a circuit diagram of electric control apparatus for raising and lowering an elevator at a stacking station.

The elevator at station A may then be raised by manually depressing the "up" button 121 shown in Fig. 19 to energize motor 96 and pressurize cylinder 93 to lift the elevator to uppermost position to again receive work sheets as soon as the elevator at station B has been filled.

While the circuit shown in Fig. 19 is duplicated at both stations, the circuit of Fig. 20 is common to both stations. As shown in Fig. 20, pneumatic cylinder 104 for station A has an air valve 125 operated by solenoid 127. Pneumatic cylinder 104 for station B has an air valve 126 operated by solenoid 128. The air cylinders 104 are loaded by springs 115 to hold the stop blades 98 in normally down position. Air valves 125, 126 in pressure lines 135 to cylinders 104 from air pressure tank 136 diagrammatically shown in Fig. 7 vent air from cylinder 104 through pipe 146 when actuated by solenoids 127, 128. When the solenoids are de-energized the air valves 125, 126 are actuated under spring load to pressurize the cylinders 104 and thereby lift the stop blades 98 against the bias of springs 115.

The circuits of Fig. 19 include a cam actuated switch 129 and the circuit of Fig. 20 includes a cam operated switch 130. Switches 129, 130 are respectively actuated by cams 131, 132, both mounted on the same shaft 62. Shaft 62 is driven by chain 61 (see Fig. 4) in such a manner that the switches 129, 130 are closed only when the first roller 67 of a given set 66 of rollers is proximate a stop blade 98.

Accordingly, the electrical circuits illustrated are so timed and interlocked with the movement of the conveyor 34 as to function only when the workpieces 29 are fully supported on roller sets 66 and no workpiece is in the course of discharge from the carrier conveyor 34 onto an elevator stack. This interlocking arrangement precludes jamming of the mechanism and false lowering of the respective elevators by transient interruption of the light beam 113 during the course of deposit of a work sheet 29 onto stack 117.

*Circuit operation*

Assume the circumstance in which the machine is first placed into operation. Both elevators at stations A and B are in raised position. Both sets of stop blades 98 are in down position. Air valves 125 and 126 in Fig. 20 are normally set to vent the cylinders 104 as actuated by the normally energized solenoids 127, 128.

In both of circuit diagrams 19 and 20, power is supplied from lines 133, 134. The various relays, switches, etc., may be contained in boxes 147. The electrical connections to motors 96 are contained in conduits 156.

Inasmuch as the stops 98 at both stations are normally down, delivery of work sheets 29 on conveyor 34 will first occur automatically at station A. Cam operated switch 129 in Fig. 19 is open except when there is no work sheet in course of descent from the carrier to the stack. Accordingly, transient actuation of photocell 108 by interruption of the beam of light 113 caused by the intermittent descent of the work sheet 29 will have no effect upon the circuit shown in Fig. 19. However, once the stack 117 builds up to a level which interrupts the beam of light 113 at the same time that switch 129 is closed, photocell 108 will trigger a voltage source 137 for relay coil 138, thus opening relay operated switch 139 and closing relay operated switch 140. If cam 131 now closes switch 129 a circuit will be completed from line 133, line 141, cam operated switch 129, line 142, relay operated switch 140, line 143, line 144 and solenoid 116 to line 134. Actuation of solenoid 116, as aforesaid, will open valve 106 to bleed hydraulic fluid from cylinder 93 at station A to cause the elevator 83 at station A to descend by gravity.

Gravity descent of the elevator will continue until either the elevator has dropped sufficiently to re-establish continuity of the beam of light 113 whereupon relay coil 138 will drop out to open switch 140, or until cam 131 re-opens switch 129 to the same effect. Accordingly, elevator 83 at station A will progressively descend as the stack 117 builds up thereon until its lug 119 engages limit switch 145 at the bottom of station A.

When switch 145 is closed, a circuit in Fig. 20 will be completed as soon as cam operated switch 130 also closes. This circuit is from line 133 through line 148, cam operated switch 130, line 149, closed limit switch 145, line 150, terminal 163, line 151, contactor switch blade 152 of relay coil 153, line 154, relay coil 155 and line 158 back to line 134.

Energization of relay coil 155 will open contactor switch 159 and close holding contactor switch 160 which maintains solenoid 155 energized through a circuit from line 133, line 161, switch 160, line 162 to terminal 163 and thence through the solenoid coil 155 as aforesaid. Thus relay 155 remains energized after cam operated switch 130 opens.

Opening of switch contactor 159 will open the circuit through line 135 to the solenoid 127 of air valve 125. Air valve 125 will then open to pressurize cylinder 104 at station A and lift stop blade 98 at station A. Worksheets 29 will thereupon continue on carrier 34 beyond station A until arrested by the lowered stop blades 98 at station B. Elevator 83 at station B will now begin to fill. Pallet 84 on the elevator 83 of station A can now be removed by a fork lift truck or the like and its load removed, the empty pallet being returned to the elevator.

The elevator 83 at station A may then be raised to uppermost position by depressing the up button 121 shown in Fig. 19. Closure of button 121 will complete a circuit from line 133 through line 166, up button 121, line 167, normally closed contactor switch 139, line 168, normally closed top limit switch 124 at station A, relay coil 169 and line 170 to line 134. Actuation of the relay coil 169 will close both contactor switches 171, 172 to complete a circuit from line 133, line 173, closed switch 172, line 174, motor 96 and line 175 to line 134. Motor 96 will now operate pump 180 to pressurize cylinder 93 and raise elevator 83 at station A. Closure of switch 171 also completes a holding circuit for relay coil 169 from line 133, line 173, switch 171, line 178, to terminal 179 which bypasses the up button 121 and through line 167, etc., through the relay coil 169. Accordingly, up button 121 can be released and the motor 96 will continue to operate pump 180 to pressurize cylinder 93 to continue to raise elevator 83 at station A. When fully raised, striker lug 122 at the side of elevator 83 will actuate the arm 123 of upper limit switch 124 to open the limit switch, thereby opening the relay circuit aforesaid and causing the contactor blades 171, 172 to drop out and de-energizing motor 96. Arm 123 also actuates limit switch 184 shown in Fig. 20 to close this switch when the elevator 83 at station A is uppermost. Motor 96 will also be de-energized if something on the elevator, such as partially loaded pallet, etc., breaks the light beam as the elevator rises. Solenoid 138 will then function to open contactor 139.

Meanwhile the apparatus at station B continues to operate to deposit worksheets onto pallet 84 thereof, the photocell circuit for station B as shown in Figure 19 functioning to progressively lower the elevator 83 at station B as the stack builds up. When the elevator at station B reaches its lowermost position its lug 119 will close limit switch 120 shown in Fig. 20, thus completing a circuit, when cam operated switch 130 is closed, from line 133, switch 130, line 181, terminal 177, limit switch 120, line 182, relay coil 153, line 183, limit switch 184 at the top of station A which was just closed by elevation of elevator 83 at station A, and line 185 to line 134. Accordingly, relay 153 opens switch blade 152 and closes switch blade 188. Switch 188 is in a holding circuit from line 133, line 189 and switch 188 to terminal 177 and thence through the coil 153 to hold contactor switch 152 open. As soon as switch blade 152 opens, the holding circuit therethrough to the relay 155 is broken and relay 155 drops out to open switch blade 160 and close switch blade 159. This re-establishes a circuit to solenoid 127 for air valve 125 which actuates the valve to vent the cylinder 104 at station A and allow its bias spring to drop the stop blades 98 to intercept work sheets for deposit on elevator 83 at station A.

The loaded pallet at station B may now be removed while stacking continues at station A. The sequence of operations hereinbefore described will repeat as long as workpieces are supplied to the stacking machine.

If at any time the operator wishes to lower one of the elevators 83 he may close the manual push button switch 190 shown in Fig. 19. This completes a circuit from line 133 through line 191, switch 190, line 144 and solenoid 116 to line 134. Solenoid 116 opens valve 106 to bleed hydraulic fluid from the cylinder 93 and permits the elevator to descend by gravity.

Under most circumstances the stop blades 98 at station B will be normally down. However, it may be desirable to discharge work sheets beyond the end of the stacking machine, if, for example, both stations are fully loaded and are unable to receive additional workpieces. Manually operated switch 192 shown in Fig. 20 may then be opened. Opening of the switch will de-energize solenoid coil 128 and actuate air valve 126 to pressurize the air cylinder 104 at station B to lift the stop plates 98. Workpieces will then simply accumulate on the floor beyond the machine.

The embodiments of the invention shown in Figs. 11–18 are primarily diagrammatic. All details of machine frame, elevators, etc., are the same as in Figs. 1–10 to which reference may be made to complete parts not repeated in Figs. 11–18.

The embodiment of the invention shown in Figs. 11–13 substitutes for the work arresting stop blades 98 of the previously described embodiment of the invention stop bars 193, 194, 195 and 196. The bars are respectively actuated by pneumatic cylinders 199, 200, 201 and 202. The respective cylinders are suspended from brackets 203 mounted on the side frame members 54. The respective bars 193–196 are provided with friction brake or clamp surfaces 204. Bars 195, 196 are aligned longitudinally at the margins of station A and bars 193, 194 are aligned longitudinally at the margins of station B as shown in Fig. 11.

Whereas the stop blades 98 in the embodiment of the invention shown in Fig. 4 actually contact the forward edges of work sheets 29 to arrest their forward movement, the stop bars 193–196 of this embodiment avoid any actual contact with the workpieces. When a stop bar is lowered into contact with the upper peripheries of all the rollers 67 of a given set 66, all such rollers will rotate reversely beneath the lowered brake bar on continued forward movement of the conveyor carrier 34. Work sheets 29 on the reversely rotating rollers are thus stopped and discharged through the work discharging gaps 82 between roller sets and onto the stacks 117 therebeneath.

Brake bars 193, 194 and their respective cylinders 199, 200 operate together at station B and brake bars 195, 196 and their respective hydraulic cylinders 201, 202 operate together at station A.

As shown in Figs. 11 and 13 the rollers 67 of any given set or group 66 have corresponding side margins beneath a brake bar at one side of the machine, corresponding side margins at the opposite ends of said rollers being relieved at 205 to avoid contact with the brake bar at the opposite side of the machine, even if the brake bar is lowered. The relieved portions 205 of alternate successive sets of rollers 67 are staggered at opposite sides of the machine. Accordingly, if brake bar 196 at station A is down as shown in Fig. 11 and brake bar 195 is up, the next succeeding set 66 of rollers is free to pass into station A without engagement on the part of the brake bar 196 with the rollers thereof because bar 196 will be longitudinally aligned with the relieved portions 205 of the next succeeding roller set.

Proper operation of the device shown in Figs. 11–13, however, requires continuous alternate actuation of the respective pneumatic cylinders 199, 200 and 201, 202 for each pair of brake bars 193, 194 and 195, 196. For example, if the elevator at station A is loading, both bars 195, 196 can't be down together or bar 195 will engage the upper periphery of the first roller 67 in the next following roller set 66 to start to discharge the work sheet thereon before it arrives at station A. Since bar 196 will not engage the upper peripheries of any of the rollers 67 in the next following roller set 66, bar 195 must be lowered precisely when the next following roller set registers all of its rollers at station A. Work sheets will then start discharging. At the same time bar 196 must be raised to avoid contact with the rollers of the next following set until they fully register with station A.

To actuate the brake bars in alternation and in timed relation to the roller sets 66 the pneumatic circuit shown in Fig. 21 may be used. The respective air cylinders 201, 202 are provided with pistons 250 and piston rods 251 connecting them to the brake bars 195, 196. The cylinders are provided with springs 252 normally biasing the bars 195, 196 to raised position. Air is admitted to the piston through lines 253, 254 and conventional air valves 255, 256 therein. The respective air valves 255, 256 have actuator arms 259, 260 respectively engaged by cams 261, 262 mounted on shaft 62. The cams are arranged so that when one cylinder 201, 202 is pressurized the other is not. Shaft 62 rotates in time with the travel of conveyor 34 as aforestated. Accordingly, the bars 195, 196 will be raised and lowered in alternation and in time with conveyor movement.

To shift the work from station A to station B a circuit similar to the one shown in Fig. 20 is employed. A conventional air valve 242 similar to air valve 125 is in air supply line 263 which supplies both branch lines 253, 254. Accordingly, when valve 242 is actuated to shut off the air in line 263 when limit switch 145 is closed as aforesaid, the springs 252 in both cylinders 201, 202 lift both bars 195, 196 notwithstanding cam action and the workpieces continue on to station B where the circuit of Fig. 21 is duplicated with respect to cylinders 199, 200 and bars 193, 194; a conventional air valve similar to air valve 126 of Fig. 20 being in line 263.

Accordingly, the embodiment of the invention shown in Figs. 11–13 has substantially the same sequence of operation as the embodiment of the invention shown in Fig. 4, except for the specific action of the brake bars 193–196 as aforestated.

To guide the respective bars 193–196 in their movement to and from engagement with the rollers, the guide structure shown in Fig. 12 may be provided. The respective ends of the brake bars 196 have sockets 206 which receive the guide pegs 207 which are mounted on frame brackets 208.

In Figs. 17 and 18 we show a further modification of apparatus for arresting the movement of work sheets above the respective stacks 117 on elevator 83 at the respective work stations A and B. In these views the conveyor 34 is shown diagrammatically. Above each station are work discharging conveyors 210 and 211. The respective conveyors 210, 211 are mounted on respective carrier frames 209 for vertical movement to and from proximity to the rollers 67 on conveyor 34. Each carrier frame 209 has a pneumatic cylinder 217 which supports it from a frame bracket 218. The cylinders 217 are actuated by the circuit shown in Fig. 20 to selectively raise and lower the carrier frames 209.

The respective conveyors 210, 211 are provided with pinch rollers 212 spaced apart a distance equal to the combined length of a roller set 66 and work discharging gap 82 adjacent thereto. The movement of the respective conveyors 210, 211 is timed in coordination with the movement of carrier 34 by means of the gears 213, 214 which respectively mesh with gears 215, 216 mounted on the sprocket shafts 58, 48 for conveyor 34. Gears 213, 214 drive chains 266 engaged about sprockets 267 which drive sprockets 219, 220 for conveyors 210, 211. Idler sprockets 268 biased by springs 269 take up the slack in chains 266. Accordingly, the carriers 209 may shift vertically without affecting the drive to conveyors 210, 211. The conveyors 210, 211 remain in timed relation to the conveyor 34 even when raised.

In the foregoing manner conveyors 210, 211 are driven at the same lineal speed as the conveyor 34. Because of the spacing between pinch rollers 212 and the timed drive of conveyors 210, 211, pinch rollers 212 are initially pre-set and thereafter will be automatically pre-timed to engage the trailing roller 67 in any given roller set 66 when the workpiece 29 thereon is directly above the stack 117, provided only that the conveyor on which the pinch roller 212 is mounted in down position.

As best shown in Fig. 18, each pinch roller 212 is also provided with a drive sprocket 223 which engages a stationary toothed rack 224 mounted on the machine frame when the pinch roller 212 travels along the lower run of its conveyor path. Accordingly, the pinch roller 212 is driven in the direction of rotation indicated by arrow 225 in Fig. 17. Motion from roller 212 may be transmitted through the intervening work sheet 29 to trailing roller 67 therebeneath to rotate the trailing roller 67 in the direction of arrow 226 in Fig. 17. Trailing roller 67 may also be laterally elongated as shown in Fig. 18 for engagement with a brake bar 227 which is fixed to frame 209. Accordingly, the brake bar 227 will cause the roller to rotate reversely independently of rotation of pinch roller 212. The peripheral speed of the rollers 67, 212 is exactly equal to the lineal speed of advance of conveyor 34. Accordingly, work sheet 29 is held stationary against continued movement with conveyor 34 and its trailing end discharged through gap 82 onto the stack 117.

Air cylinder 217 at station A is biased by spring 270 to raise carrier frame 209 above engagement of its pinch rollers 212 with the rollers of carrier 34. Air is admitted to the cylinder under control of a valve corresponding to valve 125 and the control circuit therefor as shown in Fig. 20. Under circumstances when elevator 83 at station A is loading the solenoid 127 is energized to actuate valve 125 and pressurize cylinder 217 to hold carrier 209 in down position. Accordingly, when lower limit switch 145 on elevator 83 at station A is closed the air valve 125 is actuated in the manner aforesaid to release the pressure in cylinder 217 and permit spring 270 to lift the carrier at station A. The preceding description of the operation of the circuit of Fig. 20 applies to Figs. 17 and 18 and will not be repeated at this point.

Figure 15:
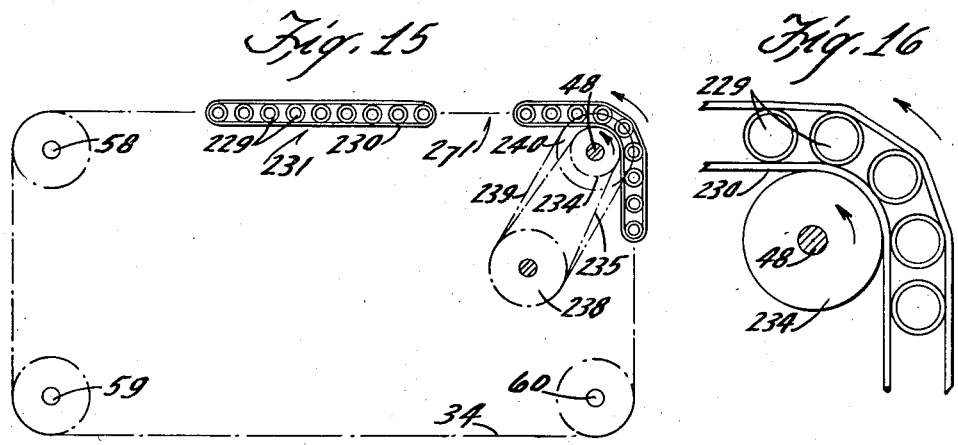
Fig. 15 is a diagrammatic side view showing a supplementary feed drum for assisting travel of the rollers of Fig. 14 around a corner.

In Figs. 14 and 15 we disclose a further modified embodiment of our invention in which non-form-sustaining or flaccid work sheets 228 are supported on spaced conveyor rollers 229 by means of belts 230 ensleeved thereabout. Rollers 229 are comparable to rollers 67 of the previously described embodiments of the invention and are grouped in sets 231 with work discharging gaps 271 therebetween. The belts 230 are particularly useful where the workpiece in whole or in part does not extend to the last roller in its particular support set. The belts preclude jambing and false discharge of the workpiece between rollers. The belts 230 interconnect entire sets 231 of ensleeved rollers 229. Stop brake bars 232, 233 similar to the bars 193–196 shown in Figs. 11–13 are desirably used in this embodiment of the invention inasmuch as physical contact between the stop bars and the work is undesirable. The means for actuating the bars 232, 233 and the control therefor is similar to that hereinbefore described.

Figure 16:
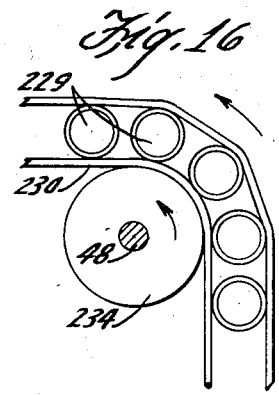
Fig. 16 is a fragmentary enlarged view of a corner portion of the device of Fig. 15.

To preclude any shifting of the belts 230 as the sets 231 of rollers pass around the corner of the carrier 34 when workpieces 228 are first deposited thereon, we may optionally dispose a power driven drum 234 in the conveyor corner and transversely thereacross as shown in Figs. 15 and 16. Drum 234 is driven by chain 235 from sprocket 238 which receives power from chain 239 trained about sprocket 240 on shaft 48. The drive is such that the drum rotates with a peripheral speed equal to the lineal speed of conveyor 34. Accordingly, drum 234 will lock the belt 230 against such shifting about the ensleeved rollers 229 as might otherwise occur because of the different radius on which its upper and lower runs travel in negotiating the corner. Accordingly, workpieces 228 delivered onto belts 230 will be supported thereon without longitudinal shifting and their timing with respect to the movement of bars 232, 233 will not be disturbed.

While belts 230 may extend completely across the width of the machine frame, we prefer to use a plurality of narrow belts spaced laterally as shown in Fig. 14. In the preferred embodiment the rollers 229 are provided with peripherally crowned bosses 241 to track the belts mounted thereon.

We claim:

1. In a device of the character described, work delivery means comprising a conveyor having sets of multiple supports for said work, said sets being spaced longitudinally of said conveyor to provide work discharging gaps therebetween, means for arresting movement of said work while said conveyor supports continue to move therebeneath and the work is discharged by gravity through said work discharging gaps, the means for arresting movement of the work comprising a retractable stop in the path of work advance.

2. In a device of the character described, work delivery means comprising a conveyor having sets of multiple supports for said work, said sets being spaced longitudinally of said conveyor to provide work discharging gaps therebetween, means for arresting movement of said work while said conveyor supports continue to move therebeneath and the work is discharged by gravity through said work discharging gaps, said supports comprising rollers, the means for arresting movement of the work comprising braking means for the upper peripheral surfaces of said rollers to cause reverse rotation of said rollers on continued forward conveyor movement.

3. In a device of the character described, work delivery means comprising a conveyor having sets of multiple supports for said work, said sets being spaced longitudinally of said conveyor to provide work discharging gaps therebetween, means for arresting movement of said work while said conveyor supports continue to move therebeneath and the work is discharged by gravity through said work discharging gaps, said supports comprise rollers, and belts ensleeved about respective roller sets.

4. In a device of the character described, work delivery means comprising a conveyor having sets of multiple supports for said work, said sets being spaced longitudinally of said conveyor to provide work discharging gaps therebetween, means for arresting movement of said work while said conveyor supports continue to move therebeneath and the work is discharged by gravity through said work discharging gaps, said supports comprising rollers, respective sets of said rollers being provided with belts ensleeved thereabout, said conveyor being provided with means supporting the conveyor for movement around corners, and supplemental drive means at said corners and engaged with the belt to drive said belt at the same lineal speed as the conveyor whereby to preclude movement of said belt at any speed other than the lineal speed of the conveyor and thereby preclude longitudinal shifting of work sheets supported thereon.

5. In a device of the character described, work delivery means comprising a conveyor having sets of multiple supports for said work, said sets being spaced longitudinally of said conveyor to provide work discharging gaps therebetween, means for arresting movement of said work while said conveyor supports continue to move therebeneath and the work is discharged by gravity through said work discharging gaps, said supports comprising rollers, the means for arresting movement of the work comprising a second conveyor mounting above the path of said work and a pinch roller carried by said second conveyor for cooperation with the work and an opposed roller of the conveyor first mentioned, and means for rotating the pinch roller in a direction to discharge said work through said gap.

6. The device of claim 5 in which the means for rotating the pinch roller comprises a shaft on said pinch roller, a drive rotor on said shaft and a relatively stationary drive means adapted for engagement with said rotor.

7. A stacking machine comprising multiple stacking stations, elevators at said stations and means for raising and lowering said elevators, conveyor means for selectively delivering work sheets to one or another of said elevators, said conveyor means comprising sets of multiple roller supports for said work sheets, said sets being spaced longitudinally of said conveyor to provide work sheet discharging gaps therebetween, means for selectively arresting movement of said work sheets above one or the other of said elevators while said roller supports continue to move therebeneath and the rollers thereof rotate reversely beneath said work sheets for gravity discharge of said work sheets through said work sheet discharging gaps onto one or another of said elevators, in further combination with means for selectively actuating said work arresting means for arresting movement of said work sheets in timed coordination with the movement of said elevators whereby when one elevator is full, work sheets are deposited on the other elevator.

8. In the device of the character described, work sheet delivery means comprising a conveyor having sets of multiple rollers for said work sheets, said sets being spaced longitudinally of said conveyor to provide work sheet discharging gaps therebetween, said rollers being provided with corresponding portions of reduced cross section aligned in the direction of conveyor movement and work arresting means projecting into alignment with said portions of reduced cross section to extend radially inwardly beyond the periphery of said rollers.

9. In a device of the character described, a stacker comprising an elevator having a platform upon which workpieces are deposited, workpiece delivery means movable over said platform and comprising a conveyor having sets of multiple supports for said workpieces, said sets being spaced longitudinally of the conveyor to provide work discharging gaps therebetween, means for arresting movement of the work when workpieces thereon are disposed over said platform whereby said workpieces are discharged from said conveyor by gravity through said gaps and onto said platform, and means responsive to the level of accumulation of workpieces in a stack on said platform for lowering said platform to accommodate additional workpieces thereon, said means comprising a photocell and light source disposed at opposite sides of said stack and means responsive to the interruption by said stack of a beam of light between said source and cell for triggering said lowering means, a control circuit for said photocell, said control circuit including a switch having an actuator timed in relation to conveyor movement so that said photocell can actuate said triggering means only after one workpiece has been deposited on said stack and prior to the discharge of a following workpiece whereby the movement of the workpiece in the course of its deposit on said stack will not trigger said lowering mechanism.

10. In a device of the character described including a work sheet delivery conveyor having sets of multiple roller supports for said work, said sets being spaced longitudinally of said conveyor to provide work discharging gaps therebetween, a stacking elevator disposed beneath said conveyor and a roller brake bar disposed above said conveyor and stacker, and means actuated in timed coordination with the arrival of a given set of rollers above said stacker for concurrently engaging said bar with all of the rollers of said set whereby continued movement of the conveyor will cause reverse rotation of said rollers whereby to discharge said workpiece through the discharge gap following said set and deposit said workpiece on said elevator.

11. The device of claim 10 in which the rollers of said sets have longitudinally aligned surface grooves, the grooves of one set being laterally offset from the grooves of the following set, said bar being longitudinally aligned with ungrooved roller portions of one set and with the grooves of the following set whereby the bar may engage the rollers of said one set but will not engage the rollers of the following set.

12. The device of claim 11 in which there is a roller engaging bar along both margins of said conveyor, alternate roller sets being provided with grooves along opposite margins thereof and respectively aligned with said bars.

References Cited in the file of this patent

UNITED STATES PATENTS

| | | |
|---|---|---|
| 1,135,454 | Hodgman | Apr. 13, 1915 |
| 2,000,273 | Conklin et al. | May 7, 1935 |
| 2,492,024 | McWilliams | Dec. 20, 1949 |
| 2,707,142 | Waite | Apr. 26, 1955 |